G. W. VERNON.
Lamp.

No. 169,318.    Patented Oct. 26, 1875.

WITNESSES:
W. W. Hollingsworth
Solon O. Vernon

INVENTOR:
Geo. W. Vernon
BY
ATTORNEYS

UNITED STATES PATENT OFFICE.

GEORGE W. VERNON, OF BONSACK'S, VIRGINIA.

IMPROVEMENT IN LAMPS.

Specification forming part of Letters Patent No. 169,318, dated October 26, 1875; application filed September 7, 1875.

*To all whom it may concern:*

Be it known that I, GEORGE W. VERNON, of Bonsack's, in the county of Roanoke and State of Virginia, have invented a new and Improved Non-Explosive Lamp; and I do hereby declare that the following is a full, clear, and exact description of the same, reference being had to the accompanying drawing forming a part of this specification, in which—

Figure 1:
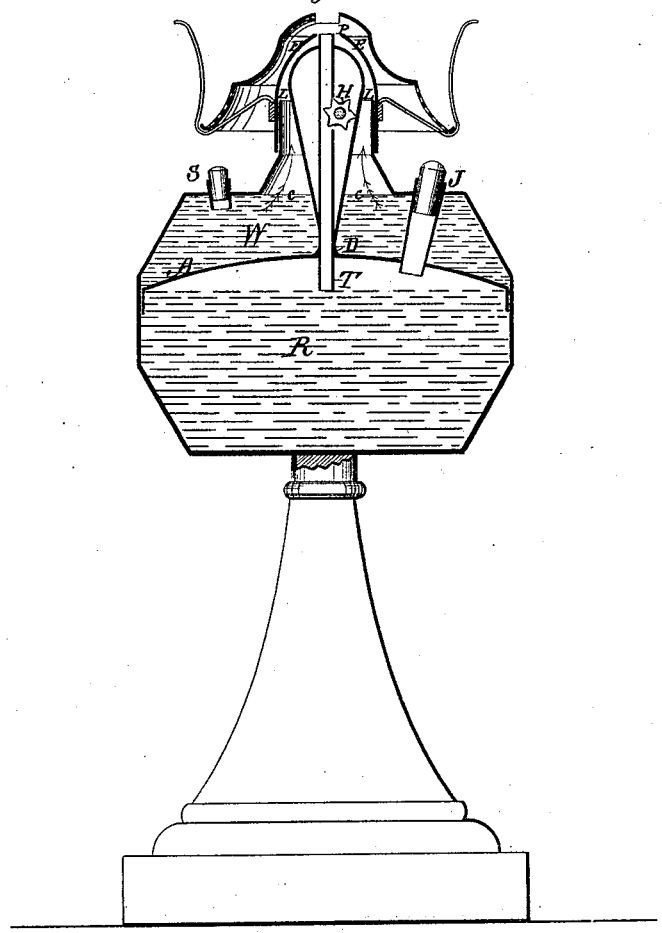
Figure 2:
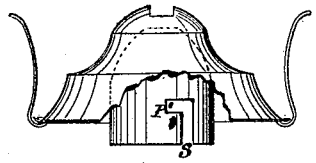

Figure 1 gives a view of the lamp as a whole, showing the different parts; and Fig. 2, a detail view.

The invention will be first described in connection with the drawing, and then pointed out in the claim.

The lamp is intended to be made out of glass or metal, and in sections or otherwise. It has two chambers, W and R, one above the other, and divided by a partition, A. The upper chamber W is for water, which is furnished through the tube S, and the lower chamber R is for oil, which is furnished through the tube J. This latter tube passes through the water-chamber W into oil-chamber R. The wick-tube T is secured into the partition A or top of oil-chamber R in any suitable manner, so as to prevent leakage from water-chamber W into oil-chamber R, and passes up through the center of water-chamber W to the burner above. Its upper half is enlarged around its outer surface, and its inner side made just large enough to admit wick all the way through. The upper part of the enlargement is of globular shape, and does not extend quite up to the upper end of tube, and it tapers off to natural size of wick-tube below. The lamp-neck proper terminates at L L has a metal extension-neck, E, with inner sides shaped to correspond with the enlarged portion of wick-tube T, and its mouth or upper end P shaped like upper end of wick-tube T. There is a space allowed all around between inner sides of this neck and outer surface of wick-tube, all the way up, so as to afford an outlet all around wick-tube T for water. Fig. 2 gives a side view of this neck, which is provided with a slit, S, having offset P', that allows neck to slip down, over wick-raiser H and lamp-neck, to the shoulder of lamp-neck. Being turned a little to one side, the wick-raiser fits into the offset P', thereby securing the extension-neck E E to lamp-neck. The wick-raiser H works inside of the enlarged portion of wick-tube T, and when this tube is secured in partition A at D the wick-raiser rests just across top of lamp-neck L L. The wick-tube T can be enlarged as much or as little as desired, and the extension-neck E E shaped accordingly, and the space around the tube between the neck and tube for outlet for water, can be as large or as small as may be necessary. The wick-tube can be either round or flat, and any kind of burner can be attached to the extension-neck E E used on this lamp.

The object of the invention is to prevent an explosion or damage in case of breakage of lamp, or from any cause that is likely to communicate the blaze to the oil. It does this in the following manner: The water-chamber W, extending, as it does, all around and above the upper surface of the oil-chamber, (when filled,) provides a body of water all around wick-tube T between the blaze and the oil below. The water surrounding, as it does, the wick-tube T between C and D, or about half of it, keeps that part of the tube cool, and thereby prevents the blaze from heating the tube farther down than to surface of water at c, which allows the blaze to warm tube low enough down to warm oil as it comes up to make it burn well. The water prevents the blaze from communicating any heat to the oil in the oil-chamber, and by keeping the lower part of the tube cool it guards against or prevents the blaze from following the wick inside of the tube to the oil by checking its progress when it comes in contact with the cool portion of tube and wick. If the lamp should be accidentally turned over the water instantly flows through the outlet around the wick-tube, as indicated by the arrows, to the blaze and extinguishes it before or by time the lamp is broken and lets out the oil. The water coming out, as it does, all around the wick-tube, through a channel pointing directly toward upper end of tube with a final outlet shaped like the tube, forms a focus at end of tube, at P, thereby enveloping the whole end of tube and wick and smothering the blaze. All the gas that can, will have to form around the wick-tube inside of lamp-neck above the body of water, and all the waste oil that oozes over end of wick-tube goes back down outside of tube and forms on the surface of the water. If the blaze should follow this tube outside by any formation of gas inside of lamp-neck, or by the tube becoming too much corroded with oil, it can only burn down to surface of water, but can do no harm, as lamp can be shaken hard or turned over so as to put it out. The water does not interfere with blaze from ordinary handling of lamp, as the water-chamber is only filled up to the dotted lines and does not communicate with blaze unless lamp is turned over on its side or upset. The shape of water-chamber is such that it forces the water out by time the lamp leans over far enough to fall on its side. The waste oil going down inside water-chamber, as it does, keeps outside of lamp neat and clean, and prevents the waste oil from forming on the outer surface of the lamp. The water can be poured out and removed at pleasure, as none of the oil escapes when this is done. The wick-tube and extension-neck can be detached from the lamp at pleasure and cleaned. An opening can be made in sides of extension-neck E E to admit a current of air into water-outlet, above water, so as to make the blaze burn better.

Having thus described my invention, what I claim as new is—

The combination of wick-tube T, enlarged toward its upper end, and the neck E, divided, as shown and described, to form a channel discharging at the top of wick-tube.

GEORGE W. VERNON.

Witnesses:
WILLIAM D. SALE,
WM. FORRER.